United States Patent [19]

Nagano

[11] Patent Number: 4,586,914
[45] Date of Patent: May 6, 1986

[54] MULTISTAGE FRONT CHAIN GEAR FOR A BICYCLE

[75] Inventor: Masashi Nagano, Izumi, Japan

[73] Assignee: Shimano Industrial Company Limited, Osaka, Japan

[21] Appl. No.: 710,684

[22] Filed: Mar. 12, 1985

[30] Foreign Application Priority Data

Mar. 15, 1984 [JP] Japan .............................. 59-37737[U]

[51] Int. Cl.[4] .............................................. F16H 55/12
[52] U.S. Cl. ..................................... 474/160; 474/161
[58] Field of Search ....................... 474/160, 161, 158

[56] References Cited

U.S. PATENT DOCUMENTS 3,200,665 8/1965 Wells .............................. 474/161 X
3,651,705 3/1972 Bertinetti et al. .................... 474/161
3,696,685 10/1972 Lampredi ............................. 474/161
4,453,924 6/1984 Sugino ................................. 474/160

FOREIGN PATENT DOCUMENTS 530885 9/1956 Canada ................................ 474/161

Primary Examiner—Stephen J. Novosad
Assistant Examiner—Frank McKenzie
Attorney, Agent, or Firm—Stevens, Davis, Miller & Mosher

[57] ABSTRACT

A multistage front chain gear for a bicycle is provided which includes a gear body which is formed of synthetic resin and having at least one larger diameter toothed body and at least one smaller diameter toothed body having different numbers of teeth. First and second contact plates are formed of material having a larger cutting resistance than the synthetic resin used for the gear body. The first contact plate is attached to the outside surface of the larger diameter toothed body, and the second contact plate is attached to the inside surface of the smaller diameter toothed body. As a result, each toothed body is protected from being cut by a driving chain.

3 Claims, 8 Drawing Figures

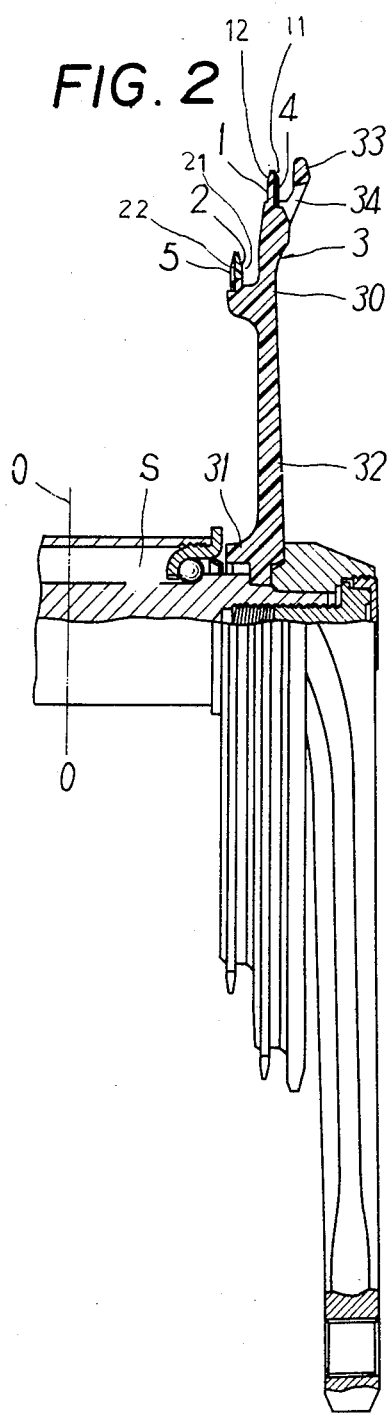
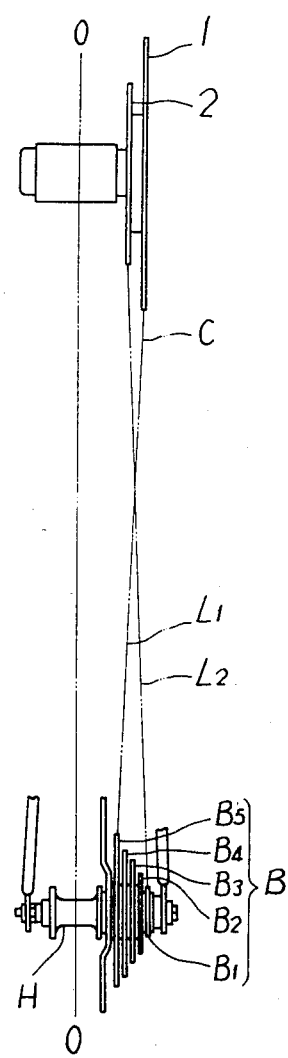

MULTISTAGE FRONT CHAIN GEAR FOR A BICYCLE

FIELD OF THE INVENTION

This invention relates to a multistage front chain gear for a bicycle, and more particularly to a multistage front chain gear comprising a gear body which is formed of synthetic resin and has at least one larger diameter toothed body and at least one smaller diameter toothed body.

BACKGROUND OF THE INVENTION

A conventional multistage front chain gear comprising a gear body molded of synthetic resin is both more lightweight and also larger in buffer action with respect to a driving chain than gears formed of metal, such as iron or aluminum, during the speed change and drive of the bicycle. Thus, such gears having gear bodies molded of synthetic resin are advantageous in that noises generated between the gear and the chain during the bicycle's running can be reduced and the toothed body can have increased ductility when subjected to a driving force, in turn imparting less shock to a cyclist.

The chain, when stretched between the multistage front chain gear and the multistage rear chain gears, especially between the larger diameter toothed body (top gear) at the front chain gear and the larger diameter rear chain gear (low gear) and between the smaller diameter toothed body (low gear) at the front chain gear and the smaller diameter rear chain body (top gear), moves obliquely to a maximum with respect to the center line of the width dimension of the bicycle so that the inner surface of a link plate at the chain comes into contact with the outside of the larger diameter toothed body with respect to the center line of the width dimension of the bicycle and with the inside of the smaller diameter toothed body with respect to said center line in an inclining manner. Also, a front gear formed of synthetic resin is smaller in cutting resistance than one formed of iron or aluminum, so that the outside of the larger diameter toothed body and the inside of the smaller diameter body are susceptable to being cut by the chain, resulting in a short life span of the gear.

The countermeasure for the above has been to apply a metal-plating onto the surface of the chain gear of synthetic resin for increasing the cutting resistance. Such metal plating, however, requires surface treatment for degreasing, so that the manufacturing process is complicated as a whole and the manufacturing cost is high. Furthermore, when the plated metal film is made thicker in order to increase the cutting resistance, the teeth at the toothed body may be deformed and also a film may be breakable so that the gear of sufficient cutting resistance cannot be obtained. Also, the synthetic resin selected for use is limited to resins suitable for metal plating, with the result that a desired synthetic resin superior in buffer action and ductility cannot be selected.

SUMMARY OF THE INVENTION

In light of the above problem, this invention has been designed. An object thereof is to provide a multistage front chain gear for a bicycle wherein a contact plate formed of material having a larger cutting resistance than synthetic resin is attached to each toothed body, so that the toothed body of synthetic resin is protected from being cut by the chain and has a long life span. Also, the chain gear is simple and inexpensive to produce and an optimal synthetic resin can be selected for use regardless of the cutting resistance of the aforesaid material, thereby redusing noises and increasing ductility during the bicycle's running.

In the multistage front chain gear of the invention comprising a gear body formed of synthetic resin and having at least one larger diameter toothed body and at least one smaller diameter toothed body, a first contact plate substantially the same in shape as the larger diameter toothed body and a second contact plate substantially the same in shape as the smaller diameter toothed body are formed. The first contact plate is attached onto the outside surface of the larger diameter toothed body and is positioned outwardly of the center line of the width dimension of the bicycle when the gear body is mounted thereto, and the second contact plate is attached onto the inside surface of the smaller diameter toothed body positioned inwardly of the same.

Accordingly, even when the chain engages with the larger diameter or smaller diameter toothed body in an inclining manner, each toothed body of synthetic resin is not brought into contact with the chain, but instead the contact plates of a material having a larger cutting resistance than the synthetic resin come into contact with the chain, thereby reliably preventing each toothed body from being cut by the chain. Hence, the gear body, which is formed of synthetic resin, has improved durability.

Furthermore, the contact plates do not coat the overall surfaces of the toothed bodies, but the dedendums of the toothed bodies are exposed so that the chain engaging with the gear is brought into contact with the dedendums of each toothed body of synthetic resin, thereby enabling reduction of noise due to the use of synthetic resin.

These and other objects of the invention will become more apparent in the detailed description and examples which follow.

BRIEF DESCRIPTION OF THE DRAWINGS

FIG. 2 is a partially cutaway side view of the FIG. 1 embodiment shown in a condition of being mounted to a crank shaft at a bicycle, FIG. 3 is an illustration of the relation between the chain lines and the chain gears incorporated in the bicycle.

DETAILED DESCRIPTION OF THE INVENTION

Figure 1:
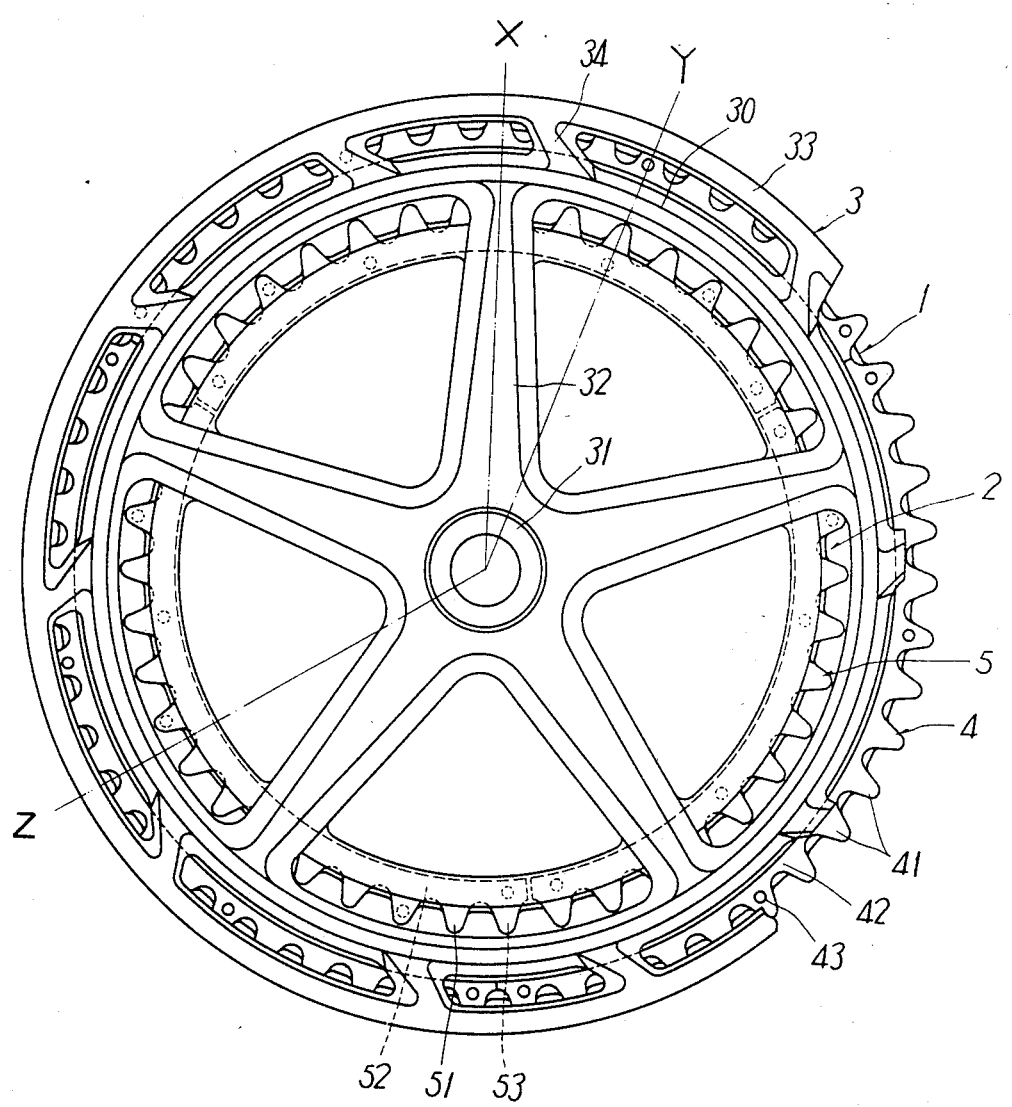
FIG. 1 is a partially cutaway front view of an embodiment of a multistage front chain gear of the invention.

Referring to FIGS. 1 and 2, a two-stage speed change front chain gear is provided with one larger diameter toothed body 1 of a larger number of teeth and one smaller diameter toothed body 2 of a smaller number of teeth. The gear includes a gear body 3 formed of synthetic resin and having an annular main body 30 integral with the toothed body 1 at the outside with respect to the center line the width dimension of the bicycle, and integral with the toothed body 2 at the inside with respect to the same as shown in FIG. 2.

The gear body 3, as shown in FIG. 2, is provided at the central portion with a boss 31, from the outer periphery of which a plurality of stays (five stays in FIG. 1) 32 project and connect the boss 31 and main body 30. Furthermore, an annular protector 33 larger in diameter than the larger diameter toothed body 1 is provided radially outwardly of main body 30 through a plurality of connectors 34.

The larger diameter toothed body 1 and smaller diameter toothed body 2, as shown in FIG. 2, have the outside surfaces 11 and 21 and the inside surfaces 12 and 22 with respect to the center line O—O of the width dimension of the bicycle when the toothed bodies 1 and 2 are mounted thereto, i.e., when the gear body 3 is mounted to the crank shaft S. Outside surfaces 11 and 21 and inside surfaces 12 and 22 form teeth having addenda and dedendums respectively.

In a case where the front chain gear constructed as described above is incorporated with a crank shaft S at the bicycle and the chain C, as shown in FIG. 3, is stretched between the larger diameter toothed body 1 and the largest diameter rear chain gear $B_5$ of multistage rear chain gears B, or the smaller diameter toothed body 2 and the smallest diameter rear chain gear $B_1$, the chain lines $L_1$ and $L_2$ are skewed to a maximum with respect to the center line O—O of the width dimension of the bicycle. As a result, the outside of larger diameter toothed body 1 and the inside of smaller diameter one 2 are cut by the chain.

In the embodiment shown in FIGS. 1 through 7, a first contact plate 4 larger in cutting resistance than the gear body 3 of synthetic resin is attached to the outside surface of larger diameter toothed body 1 and a second contact plate 5 larger in cutting resistance than the same is attached to the inside surface of smaller diameter toothed body 2, so that the first contact plate 4 coats the outside surface of toothed body 1 when the chain line $L_1$ is skewed to a maximum as shown in FIG. 3 and the second contact plate 5 coats the inside surface of toothed body 2 when the chain line $L_2$ is similarly skewed. Both contact plates 4 and 5 are attached by being inserted onto the toothed bodies 1 and 2 when molded of synthetic resin together with the gear body 3 in a manner described more fully hereinbelow.

The toothed bodies 1 and 2 and gear body 3 employ a synthetic resin, such as ABS resin, polyamide resin or polycarbonate resin, which has great wear resistance and elasticity and superior noise suppression.

The contact plates 4 and 5 employ metal or ceramic, such as stainless steel, which has a larger cutting resistance than the synthetic resin, or hardened steel, such as SK7 or S45C steel prescribed in the Japanese Industrial Standard, and which also has a larger wear resistance than the synthetic resin.

Figure 4:
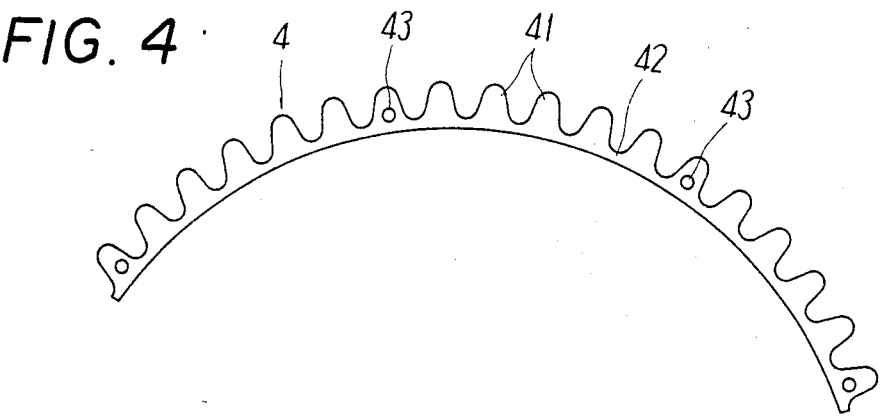
FIG. 4 is a partial view of a contact plate.
Figure 5:
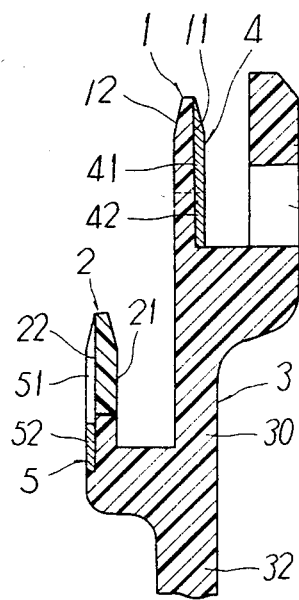
FIGS. 5, 6 and 7 are enlarged sectional views taken along the lines $O_1$-X, $O_1$-Y and $O_1$-Z in FIG. 2.
Figure 6:
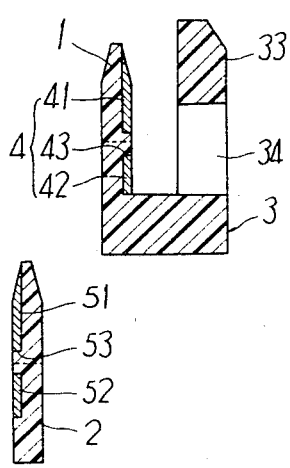
Figure 7:
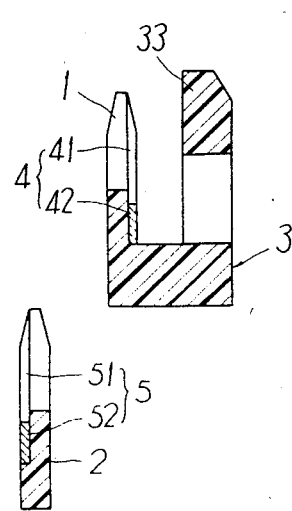

The first contact plate 4, as shown in FIGS. 1 and 4, comprises a plurality of teeth 41 corresponding to those at the larger diameter toothed body 1 and a connector 42 connecting the root of each tooth 41, and is formed in a circular arc as a whole. A plurality of such contact plates 4 in circular arc may be fixed onto the outside surface of larger diameter toothed body 1 and combined into a ring as a whole, or may previously be formed in a ring.

The second contact plate 5, the same as first contact plate 4, comprises a plurality of teeth 51 corresponding to those at the smaller diameter toothed body 2 and a connector 52 connecting the roots of teeth 51.

First and second contact plates 4 and 5 are fixed to the outside surface of larger diameter toothed body 1 and the inside surface of smaller diameter toothed body 2 such that, for example, a plurality of through bores 43 are positioned circumferentially of first contact plate 4 and a plurality of through bores 53 are positioned similarly at the second contact plate 5, so that when the toothed bodies 1 and 2 are molded, the through bores 43 and 53 are filled with synthetic resin, thereby fixing the first and second contact plates 4 and 5 onto the toothed bodies 1 and 2 not rotatably relative thereto respectively. In addition, the through bores 43 and 53 may be provided at the teeth 41 and 51, or at the connectors 42 and 52. The contact plates 4 and 5, as shown in FIG. 1, are shifted at their dedendums radially inwardly from those of toothed bodies 1 and 2 to thereby expose the dedenums thereof, so that the rollers of chain C are adapted to come into contact not with the dedendums of teeth 41 and 51, but with those of toothed bodies 1 and 2 of synthetic resin, thus enabling noises generated by the chain to be reduced to a minimum.

In the aforesaid construction, although the chain C is shifted along the chain line $L_1$ or $L_2$ and brought into contact with the outside surface of larger diameter toothed body 1 or the inside surface of smaller diameter toothed body 2, the contact plates 4 and 5, which are fixed to the toothed bodies 1 and 2 and larger in cutting resistance with respect to the chain C than the toothed bodies 1 and 2 of synthetic resin respectively, can reliably be prevented from being cut during contact with the chain C, thereby keeping their driving function stable over a long time.

Furthermore, the contact plates 4 and 5 are lower at the dedendums than the toothed bodies 1 and 2 such that they are not hit by the chain C, whereby the chain C is brought into contact with only the dedendums of toothed bodies 1 and 2 of synthetic resin superior in noise suppression, thereby enabling noise generation to be suppressed to a minimum.

Figure 8:
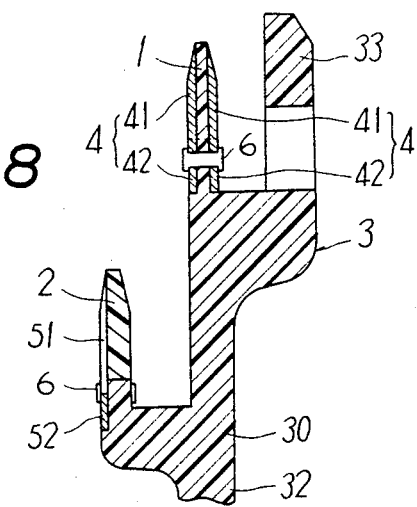
FIG. 8 is a sectional view of a modified embodiment of the invention, corresponding to the view shown in FIG. 5.

First contact plate 4, as shown in FIG. 8, may be attached also to the inside surface of larger diameter toothed body 1, so that when the chain C is shifted from the smaller diameter toothed body 2 to the larger diameter toothed body 1, noises generated by press-contact of chain C with the inside surface of toothed body 1 is reduced.

Alternatively, the contact plates 4 and 5, as shown in FIG. 8, may be fixed by fixing members, such as rivets, to the toothed bodies 1 and 2 respectively, or may, for example, be detachably engaged therewith or attached by use of suitable elastic plates in press-contact therewith.

Although several embodiments have been described, they are merely exemplary of the invention and not to be construed as limiting, the invention being defined solely by the appended claims.

What is claimed is:

1. A multistage front chain gear for a bicycle comprising:
   (a) a gear body having at least one larger diameter toothed body and at least one smaller diameter toothed body, said gear body being formed of synthetic resin, said larger diameter toothed body and said smaller diameter toothed body being axially displaced relative to each other and each comprising an outside surface positioned outwardly with respect to a center line of a width dimension of the bicycle and an inside surface positioned inwardly with respect to said center line of said width dimension when said toothed bodies are mounted to the bicycle;

(b) a first contact plate formed of material having a greater cutting resistance than said synthetic resin, attached to at least said outside surface of said larger diameter toothed body, and covering each tooth of said larger diameter toothed body; and (c) a second contact plate formed of material having a greater cutting resistance than said synthetic resin, attached to at least said inside surface at said smaller diameter toothed body, and covering each tooth at said smaller diameter toothed body.

2. A multistage front chain gear for a bicycle according to claim 1, wherein said first and second contact plates each comprise tooth-shaped portions corresponding to teeth at said larger diameter toothed body and said smaller diameter toothed body respectively, said tooth-shaped portions at each of said first and second contact plates being smaller in its dedendum circle than each of said toothed bodies.

3. A multistage front chain gear for a bicycle according to claim 1, wherein a said first contact plate is attached to said outside surface and said inside surface of said larger diameter toothed body and a said second contact plate is attached to said outside surface and said inside surface of said smaller diameter toothed body.

* * * * *